(12) United States Patent
Saiki

(10) Patent No.: US 11,472,295 B2
(45) Date of Patent: Oct. 18, 2022

(54) REGENERATIVE BRAKING ENERGY DISSIPATER AND SYSTEM AND METHOD OF USING SAME

(71) Applicant: Neal Saiki, Santa Cruz, CA (US)

(72) Inventor: Neal Saiki, Santa Cruz, CA (US)

(73) Assignee: MSNS, LLC, Morgan Hill, CA (US)

( * ) Notice: Subject to any disclaimer, the term of this patent is extended or adjusted under 35 U.S.C. 154(b) by 397 days.

(21) Appl. No.: 16/686,078

(22) Filed: Nov. 15, 2019

(65) Prior Publication Data

US 2020/0282839 A1 Sep. 10, 2020

Related U.S. Application Data

(60) Provisional application No. 62/785,263, filed on Dec. 27, 2018, provisional application No. 62/849,412, filed on May 17, 2019.

(51) Int. Cl.
*B60L 7/22* (2006.01)
*B60L 50/60* (2019.01)
*B60L 58/26* (2019.01)

(52) U.S. Cl.
CPC ............ *B60L 7/22* (2013.01); *B60L 50/60* (2019.02); *B60L 58/26* (2019.02); *B60L 2200/12* (2013.01)

(58) Field of Classification Search
CPC .. B60L 7/22; B60L 50/60; B60L 58/26; B60L 2200/12

USPC ......................... 318/376, 375, 362
See application file for complete search history.

(56) References Cited

U.S. PATENT DOCUMENTS

| | | | |
|---|---|---|---|
| 8,630,759 B2 * | 1/2014 | Bauerle | B60L 7/18 903/907 |
| 9,054,628 B2 * | 6/2015 | Numakura | H02P 27/08 |
| 9,586,485 B2 * | 3/2017 | Badger | B60L 1/003 |
| 2004/0104008 A1 | 6/2004 | Yeung | |
| 2011/0048830 A1 | 3/2011 | Radtke | |
| 2011/0272230 A1 | 11/2011 | Sekiya | |
| 2014/0291050 A1 | 10/2014 | Yates et al. | |
| 2014/0356652 A1 | 12/2014 | Boddakayala et al. | |
| 2016/0243927 A1 | 8/2016 | Biderman et al. | |

FOREIGN PATENT DOCUMENTS

EP 122580 A2 7/2002

* cited by examiner

*Primary Examiner* — David Luo
(74) *Attorney, Agent, or Firm* — Michael A. Guth (57) ABSTRACT

A regenerative braking energy dissipater system which is adapted to dissipate energy from a regenerative brake in the case when the battery cannot accept further energy. The system may switch the energy flow from the battery to a dissipater when the battery has reached a high level of charge. The dissipater may include load resistors. The system may be designed such that the airflow around the dissipater flows over and under the dissipating plate.

30 Claims, 9 Drawing Sheets

REGENERATIVE BRAKING ENERGY DISSIPATER AND SYSTEM AND METHOD OF USING SAME

CROSS-REFERENCE TO RELATED APPLICATIONS

This application claims priority to U.S. Provisional Patent Application No. 62/785,263 to Saiki, filed Dec. 27, 2018, which is hereby incorporated by reference in its entirety. This application claims priority to U.S. Provisional Patent Application No. 62/849,412 to Saiki, filed May 17, 2019, which is hereby incorporated by reference in its entirety.

BACKGROUND

Field of the Invention

The present invention relates to electric transport, and more specifically to a regenerative braking energy dissipater system.

Description of Related Art

Motivated by the environmental, public health, ecological, and carbon-footprint issues associated with gasoline-powered automobiles, researchers, governments, and society as a whole have been engaged in a search for viable alternatives. Electric bicycles (e-bikes), which are propelled by a combination of pedaling and battery-powered electric motors, are a promising alternative to automobile transportation. Their primary advantages include lower purchase and operating costs compared to cars, ability to travel longer distances and with less physical effort compared to traditional bicycles, and zero emissions during operation.

Regenerative braking is a unique technique that is used in EVs to capture energy that the vehicle has due to its motion or, in other words, its kinetic energy that would have been wasted when the vehicle decelerates while braking. By taking a measure of the initial and final vehicle velocity, the amount of kinetic energy which is lost to braking can be calculated.

Urban drive cycles have a considerable amount of acceleration and decelerating periods due to traffic control systems in place around towns and cities, and therefore, when decelerating, significant energy is lost. However, with regenerative braking, this energy can be captured, and 'waste' energy can be harnessed and utilized for vehicle propulsion. Similarly, off road cycles also have a considerable need for acceleration and deceleration due to climbing and descending hills.

A drawback with regenerative braking is that under some operating scenarios the battery may not be able to accept more energy. For example, if the battery is fully charged and yet the user desires to brake further, the system may not be able to accommodate this desire. One option is to switch over to the mechanical brake when the battery can no longer accept energy. This is not a good solution because it is important to have consistent braking. Further, it may be quite difficult to implement this switchover.

In some systems, a regenerative braking system may supplant the heritage mechanical braking system entirely. An exemplary system is seen in U.S. patent application Ser. No. 16/541,130 to Saiki. Such a system does not offer the possibility of switching back to the mechanical brakes should circumstances call for it. Thus, should the battery in a regenerative braking system be unable to accept more energy, an alternative solution is needed.

What is called for is a system which can accept energy from a regenerative brake without charging the battery. What is also called for is system which can dissipate the energy created from a regenerative braking system.

SUMMARY OF THE INVENTION

A regenerative braking energy dissipater system which is adapted to dissipate energy from a regenerative brake in the case when the battery cannot accept further energy. The system may switch the energy flow from the battery to a dissipater when the battery has reached a high level of charge. The dissipater may include load resistors. The system may be designed such that the airflow around the dissipater flows over and under the dissipating plate.

DETAILED DESCRIPTION

Figure 1:
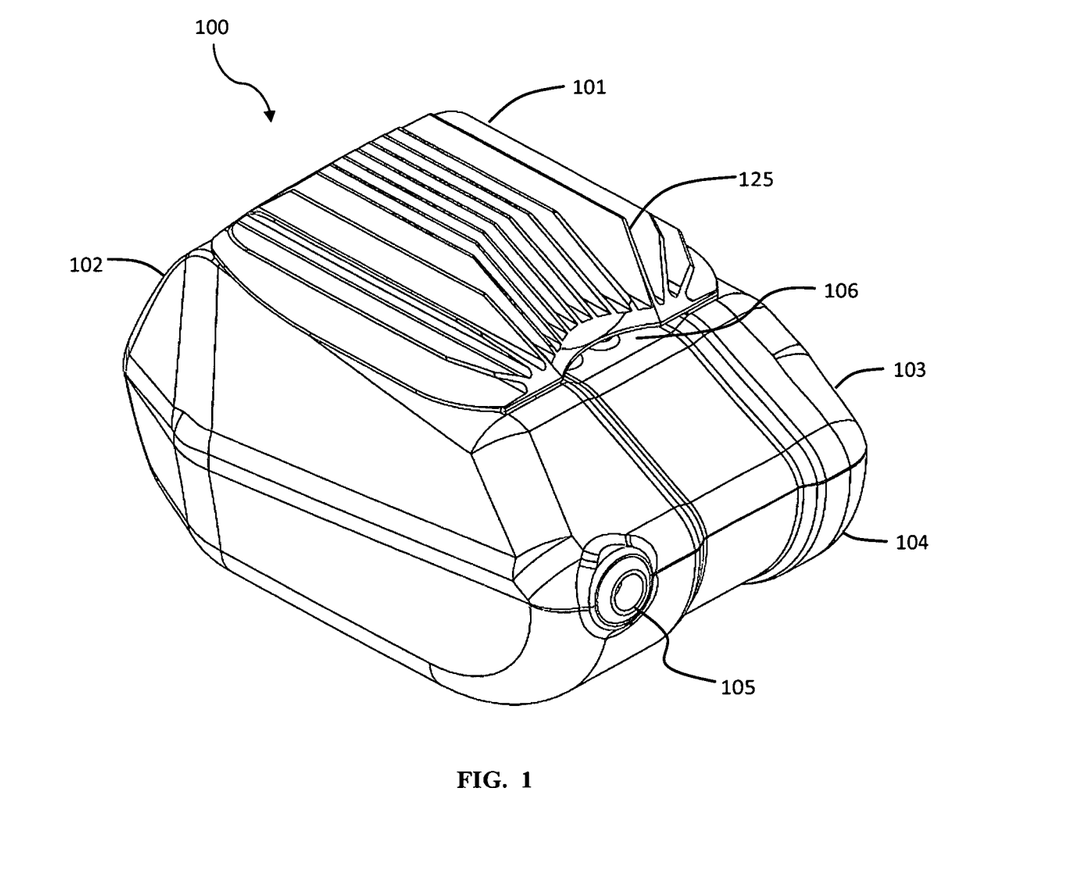
FIG. 1 is a view of a regenerative braking energy dissipation system according to some embodiments of the present invention.

In some embodiments of the present invention, as seen in FIG. 1, a regenerative braking energy dissipater system 100 has a battery case 102 and a dissipater 101. The energy dissipater system may have an electronics portion within the battery case 102 which may direct input energy either to the battery or to the dissipater 101. The battery case 102 may have an upper case portion 103 and a lower case portion 104. The battery case 102 may have a charging interface receptacle 105 adapted to receive power for the charging of the battery or batteries. An airflow passage 106 allows for airflow underneath the dissipater 101.

Figure 2:
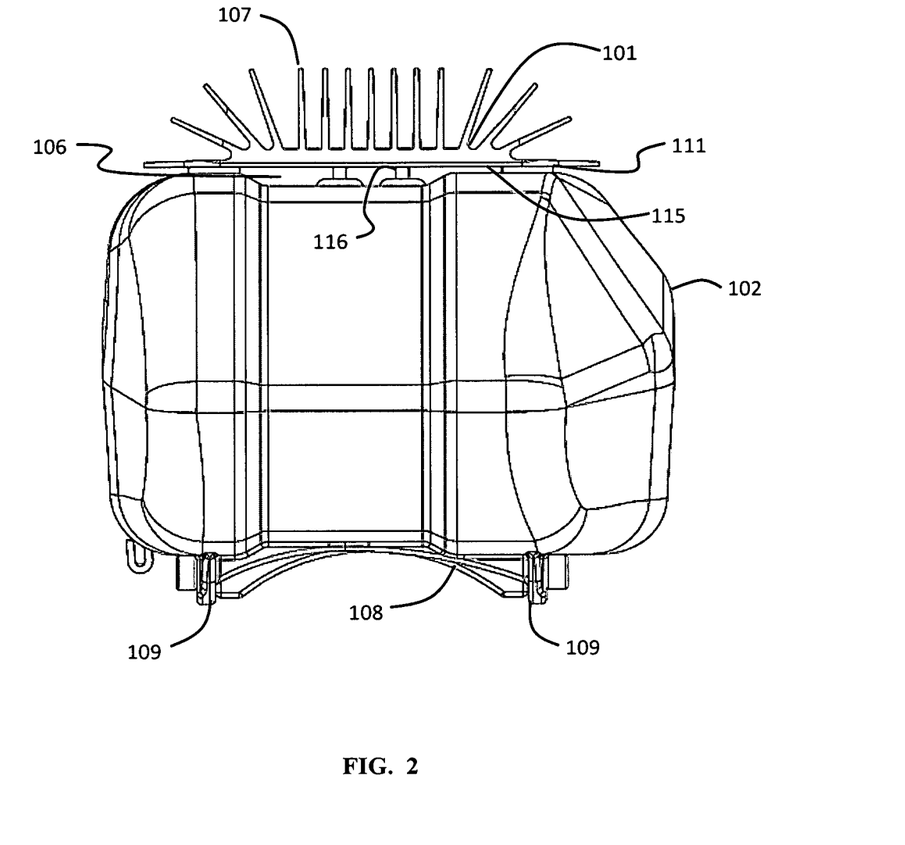
FIG. 2 is a rear view of a regenerative braking energy dissipation system according to some embodiments of the present invention.

As seen in FIG. 2, the dissipater 101 may include a baseplate 115 and have fins 107 adapted for convective cooling of the dissipater. The baseplate 115 of the dissipater 101 may be electrically coupled to the battery case 102 with coupling pins 116. The baseplate 115 is also fastened to the battery case 102 with adhering portions 111. The adhering portions 111 may be an adhering compound such as a silicone caulk in some aspects. The adhering portions 111 may also be thermally insulating materials such as silicone foam, foam rubber, or plastic. In some aspects, the baseplate 115 is mounted in an offset position relative to the top of the battery case 102. The offset mounting position defines an airflow passage 106 which allows for airflow beneath the mounting plate as well as through the fins 107. The bottom of the battery case may include a mounting interface 108, which may be shaped to conform to a mating piece such as a bicycle frame tube, for example. Coupler 109 may allow for fastening of the battery case 102 to the mating piece. In some aspects, the battery case may be of a material that is not suited for exposure to the temperatures to which the dissipater plate may reach during use. The adhering portions 111 may include thermally insulating mounting pads which reduce or eliminate the conductive heat flow between the dissipater and the mounting surfaces of the battery case.

Figure 3:
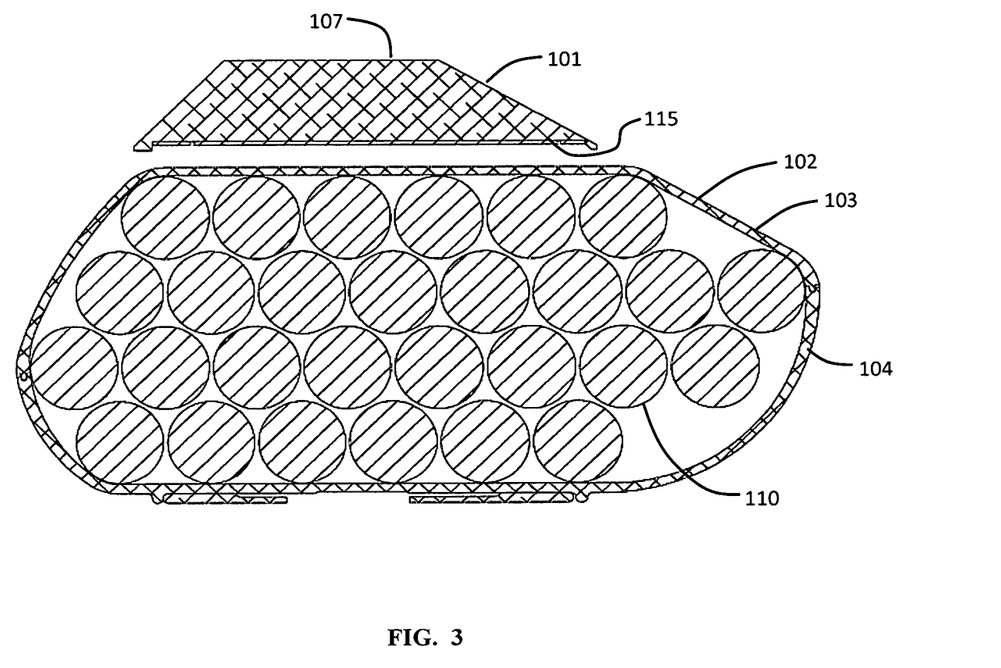
FIG. 3 is a cross-sectional view of a regenerative braking energy dissipation system according to some embodiments of the present invention.
Figure 6:
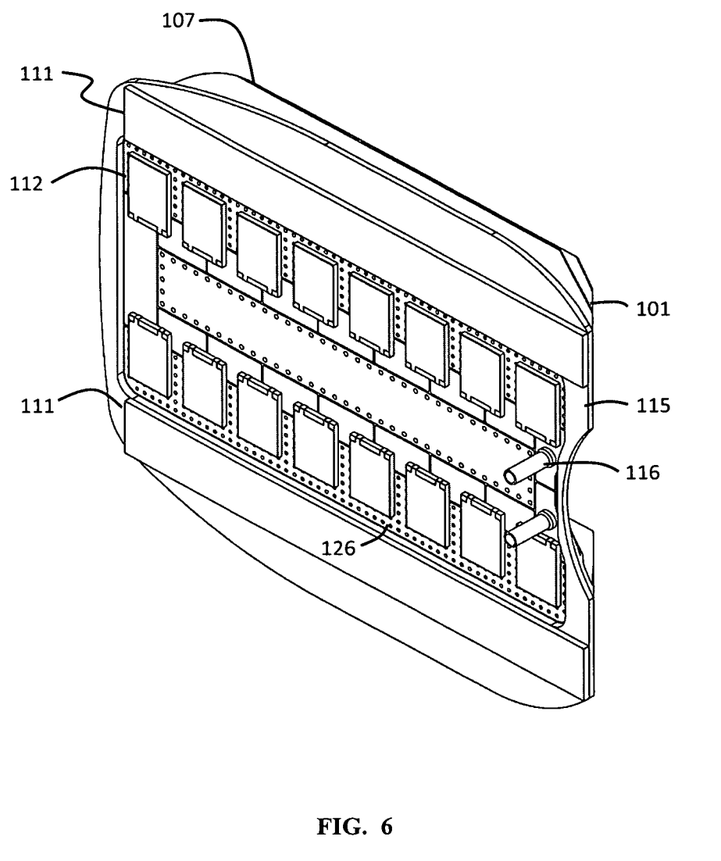
FIG. 6 is a view of an energy dissipater of a regenerative braking energy dissipation system according to some embodiments of the present invention.
Figure 7:
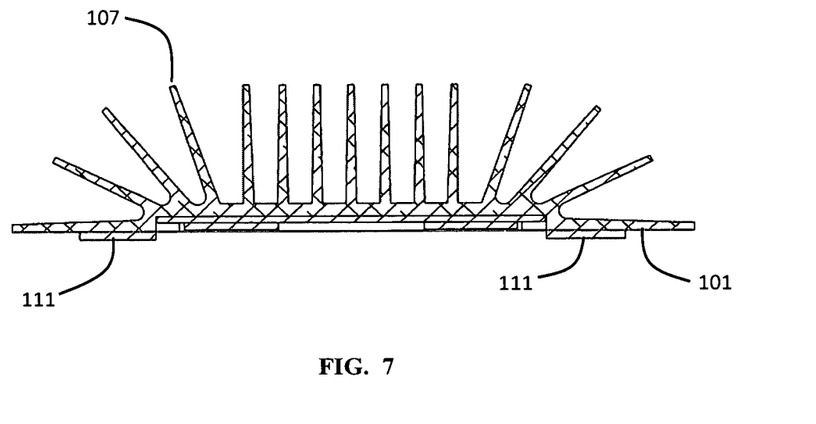
FIG. 7 is a front view of an energy dissipater of a regenerative braking energy dissipation system according to some embodiments of the present invention.

FIG. 3 illustrates a cross-sectional view of the regenerative braking energy dissipater system according to some embodiments of the present invention. The battery case 102 is seen with a plurality of battery cells 110 contained within. The upper case portion 103 and the lower case portion 104 are adapted to form the battery case 102. A dissipater 101 is fastened to the top of the battery case 102. The baseplate 115 of the dissipater 101 has fins 107 extending from its top surface. The dissipater 101 may function as a heat exchanger such that energy load dissipated from the dissipater is removed as heat via convective cooling. FIG. 6 illustrates a cross-sectional view of the dissipater on the cross-axis.

Figure 4:
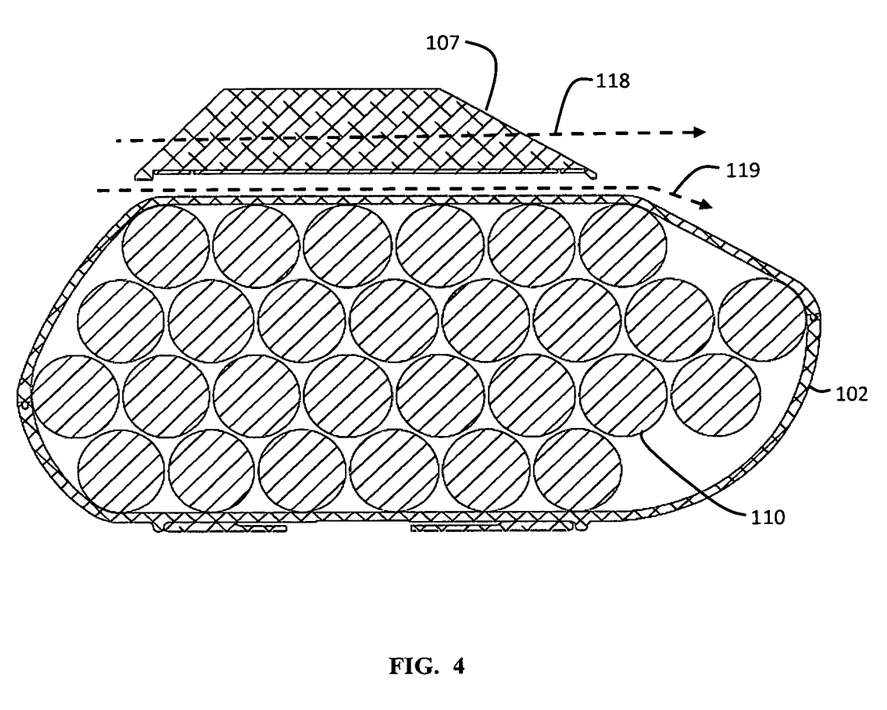
FIG. 4 is a cross-sectional view of the airflow through an energy dissipater of a regenerative braking energy dissipation system according to some embodiments of the present invention.

FIG. 4 illustrates examples of airflow paths which may be part of the convective cooling of the dissipater. A first airflow path 118 between and along the fins 107 allows for convective cooling of the dissipater 101. A second airflow path 119 may also flow within the airflow passage 106 below the baseplate 115 of the dissipater 101 and above the top surface of the upper case portion 103 of the battery case 102, also allowing for convective cooling of the dissipater 101. The dissipater with its airflow passage 106 may be well suited for uses where the dissipater is mounted to surfaces which cannot tolerate high heat, such as the battery case, or a carbon bicycle frame, for example.

In an exemplary embodiment, the dissipater 101 may be 90 mm wide and 100 mm long. The fins may be 1.2 mm thick and the base and taper to 0.8 mm at the outer ends. The overall height of the dissipater 101 may be 20 mm. In some aspects, the battery case 102 is wider than the width of the dissipater 101 in order to minimize the chance that the user would brush against the dissipater while riding, as the dissipater may be hot at times. In some aspects, the dissipater 101 is not as wide as the frame portion of the bicycle to which it is mounted, again to minimize the change that the user would brush against the dissipater while riding.

Figure 5:
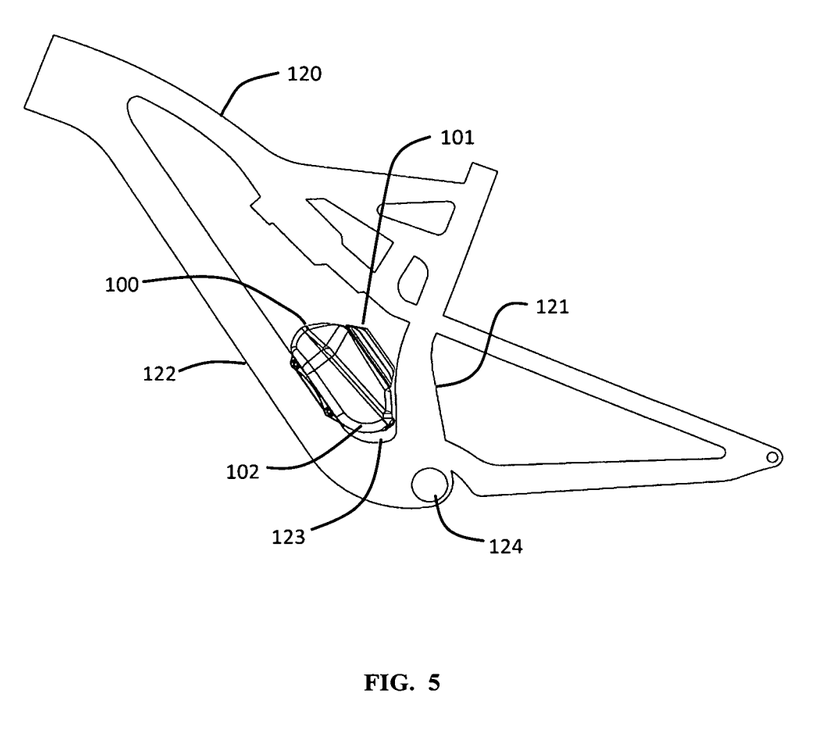
FIG. 5 is a view of a regenerative braking energy dissipation system mounted to a bicycle frame according to some embodiments of the present invention.
Figure 8:
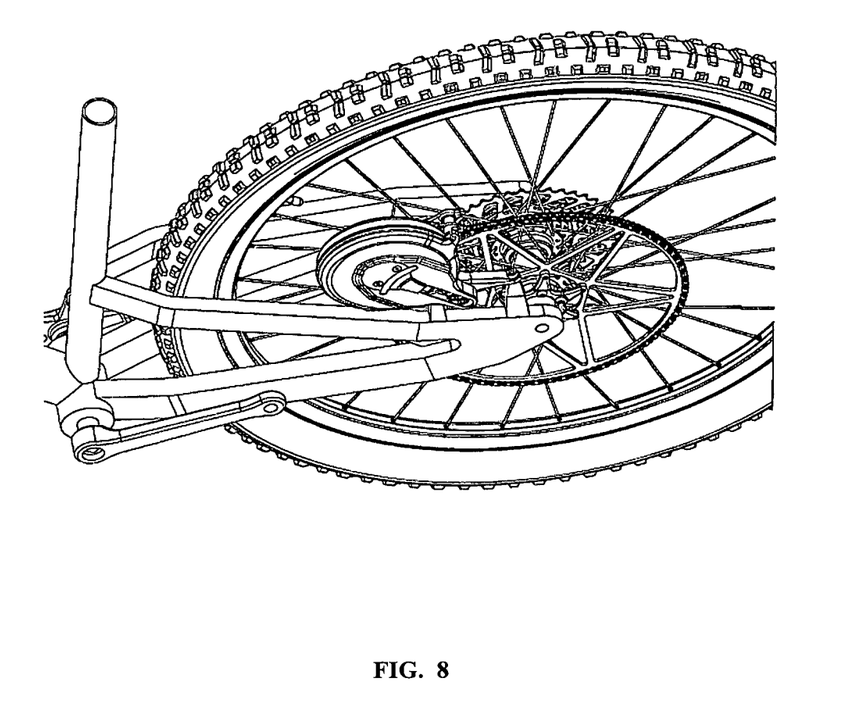
FIG. 8 is a view of a regenerative braking system on a bicycle.

FIG. 5 illustrates an exemplary bicycle frame 120 with a regenerative braking energy dissipater system 100 mounted therein. The battery case 102 may reside against the down tube 122 with the dissipater 101 adjacent to the seat tube 121. The system 100 may reside in or near the well 123 adjacent to the bottom bracket 124 and between the down tube 122 and the seat tube 121. The dissipater 101 may have a central portion 125 of the fins and the baseplate 115 shaped or recessed to avoid interference with the seat tube of the bicycle. FIG. 8 illustrates a bicycle with a rear drive system with regenerative braking without a mechanical brake. In such a system, there is not a mechanical brake to switch over to when the battery has reached its charging capacity and can no longer accept further charging. In such a system a need exists to provide a load for the voltage coming from further regenerative braking.

A control portion may also reside within the battery case 102. The control portion may receive power from the regenerative braking system and route it to the batteries in order to recharge the batteries. The control portion may route the power to the batteries until the batteries have reached a charge level as signified by their voltage, and then the control portion may route the power the dissipater. The voltage which triggers the switch from charging the battery to dissipating the power may be set at a voltage higher than the charging voltage from the regenerative braking system so that the dissipater does not come on while the battery is being charged. An exemplary battery voltage is 48 volts. In some aspects, the battery voltage may be 52 volts.

In some embodiments of the present invention, as seen in FIG. 6, the dissipater 101 has a resistor assembly 112, which may include a plurality of resistors, adapted to provide a load for the voltage generated by the regenerative braking system in the case wherein the control portion has routed the power to the dissipater. The resistors of the resistor assembly 112 may be mounted onto a printed circuit board (PCB) 126. The PCB and its mounted components may be mounted into a cavity on the underside of the dissipater baseplate 115. The PCB and its mounted components may be covered with a high temperature potting compound. An exemplary dissipation may be in the range of 500-1000 Watts for a few seconds. In some aspects, the dissipation wattage is in the range of 500-1500 Watts. The dissipater 101 may be fastened to the battery case 102 with adhering portions 111.

In some aspects, a method for dissipating regenerative braking energy may be used with a bicycle, a tricycle, or other similar vehicle. A method for the dissipation of heat created by load resistors used to load a regenerative braking system may be utilized with a regenerative braking system. The regenerative braking system may be part of an electric drive system, such as used with an electric motor driven bicycle. In some aspects, an electric motor may be used to provide power to propel a bicycle. In some aspects, the electric motor may also be used as a brake for the bicycle. This regenerative braking aspect may deliver power to recharge the battery or batteries which power the motor. In some aspects, the wheel which is driven by the bicycle may not have a mechanical brake, such that the regenerative braking portion is the only brake for that wheel.

With only a regenerative brake and not a backup mechanical brake, it may very important to maintain braking capability even if the battery is charged and can no longer receive further power. In some aspects, the method may comprise the steps of generating power while braking with a regenerative braking system. The power generated may be used to recharge the battery or batteries until the battery or batteries have reached a charging limit. The system may then transition from charging the battery or batteries to diverting the power to load resistors which act as a dummy load for the power from the regenerative braking system. The load resistors may be mounted onto a dissipater plate of a dissipater which is adapted to have air flow around it to cool the dissipater. The dissipater may be mounted onto a mounting surface with an airflow pathway or pathways between the bottom of the dissipater plate and the mounting surface. The dissipater may also have a top surface adapted to have air flow over in and around it to cool the dissipater. The top surface may have fins which maximize the area which can be convectively cooled by the airflow. As the brake is used and then the power is diverted to the load resistors, air flowing along a first airflow pathway between and along the fins cools the dissipater, and air flowing along a second airflow pathway below the dissipater plate and above the mounting surface also cools the dissipater. As the motor is used more to power the bicycle, the charge level of the battery may again lower, such that energy derived from regenerative braking may again be used to charge the battery or batteries.

Figure 9:
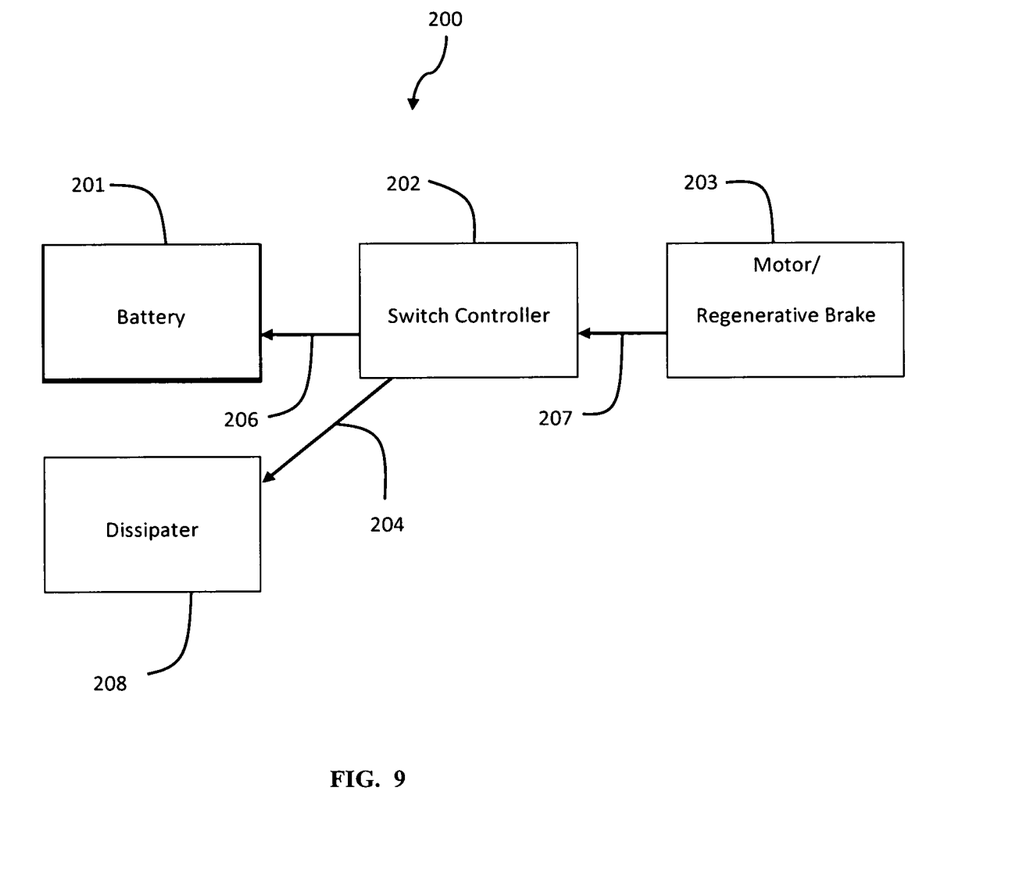
FIG. 9 is a system diagram of a regenerative braking energy system according to some embodiments of the present invention.

FIG. 9 illustrates a system diagram of a regenerative braking energy dissipater system 200 according to some embodiments of the present invention. In an exemplary configuration, a motor 203 is also used as a regenerative brake on a bicycle or other lightweight vehicle. As the motor is used to brake the system, such as to slow down the vehicle, it will generate electrical power. The motor 203 is coupled to a switch controller 202. The motor may transmit 207 to the switch controller 202. The switch controller 202 is electrically coupled to the battery 201 and to a dissipater 208. When the battery is in a state of lower charge, the switch controller 202 will route 206 electrical power to the battery 201 in order to restore charge to the battery 201. However, the battery 201 may reach a state of charge where it is unable to or should not receive further charge. The vehicle, though, may still need to be braked, so an alternate routing for the power generated by the regenerative braking is needed to effect this braking. The electrical power generated by the regenerative braking may be routed 204 to a dissipater 208 adapted to dissipate the electrical energy. The switch controller 202 may sense the state of charge of the battery 201 and route 206 energy to the battery 201 when the battery is below a threshold state of charge, and route 204 energy to the dissipater 208 when the battery 201 is above a threshold state of charge. In this way, the regenerative braking system 200 may continue to function as a brake even when the battery is not able to or should not receive further charge.

In some aspects, the regenerative braking energy dissipater system may be used with a lightweight electric vehicle. The lightweight electric vehicle may be a vehicle of less than approximately 50 kg, for example. Lightweight electric vehicles often do not have extensive metallic structures that can be used to thermally conduct and dissipate braking energy. In some aspects, the lightweight electric vehicle may be a scooter or a tricycle. In some aspects, the dissipater may be mounted to a portion of the vehicle which is not suited to be exposed to high temperatures. The dissipater may be mounted onto a composite panel, for example, and the heat seen in the dissipater plate while the resistor assembly is loaded may exceed the allowable temperature exposure range of the mounting area. In such a circumstance, the dissipater may be mounted using thermally insulating mounting pads between the mounting surfaces of the dissipater plate and the mounting surfaces of the vehicle.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A regenerative braking energy dissipater system for a lightweight electric vehicle, said system comprising:
   a lightweight electric vehicle, said lightweight electric vehicle comprising:
   a mounting surface; and
   a regenerative braking system; and
   a dissipater, said dissipater coupled to said mounting surface, said dissipater comprising:
   a dissipater plate, said dissipater plate comprising a first side and a second side;
   a resistor assembly coupled to the first side of said dissipater plate, wherein said dissipater is coupled to said mounting surface such that an airflow passage exists between said first side of said dissipater plate and said mounting surface.

2. The regenerative braking energy dissipater system of claim 1 further comprising:
   a battery case, said battery case containing one or more batteries, said battery case mounted to said lightweight electric vehicle, wherein said battery case comprises said mounting surface.

3. The regenerative braking energy dissipater system of claim 2 comprising a switch controller, said switch controller comprising an electrical power input portion, said switch controller electrically coupled to said one or more batteries and to said resistor assembly, said switch controller adapted to switch input power between said one or more batteries and said dissipater based upon the charge state of said one or more batteries.

4. The regenerative braking energy dissipater system of claim 2 wherein said dissipater plate is mounted with thermally insulated mounting pads.

5. The regenerative braking energy dissipater system of claim 1 wherein said dissipater plate has fins on said second side.

6. The regenerative braking energy dissipater system of claim 1 wherein said resistor assembly compromises a circuit board and one or more resistors mounted to said circuit board.

7. The regenerative braking energy dissipater system of claim 6 wherein said resistors are surface mount resistors.

8. The regenerative braking energy dissipater system of claim 7 wherein said resistors are thin or thick film resistors.

9. The regenerative braking energy dissipater system of claim 6 wherein said dissipater plate is mounted with thermally insulated mounting pads.

10. The regenerative braking energy dissipater system of claim 1 wherein said dissipater plate is mounted with thermally insulated mounting pads.

11. The regenerative braking energy dissipater system of claim 10 wherein said mounting surface on said lightweight electric vehicle is temperature sensitive.

12. The regenerative braking energy dissipater of claim 11 wherein said mounting surface on said lightweight electric vehicle is composite or plastic.

13. The regenerative braking energy dissipater of claim 10 wherein said thermally insulating mounting pads are made from rubber, foam or plastic.

14. A regenerative braking energy dissipater system for a bicycle, said system comprising:
   a bicycle, said bicycle comprising:
   a bicycle frame; and
   a regenerative braking system; and
   a dissipater, said dissipater coupled to said bicycle frame, said dissipater comprising:
   a dissipater plate, said dissipater plate comprising a first side and a second side; and
   a resistor assembly coupled to the first side of said dissipater plate; wherein said dissipater is coupled to said bicycle frame such that an airflow passage exists between said first side of said dissipater plate and the surface to which the dissipater plate is mounted.

15. The regenerative braking energy dissipater system of claim 14 further comprising:
a battery case, said battery case containing one or more batteries, said battery case mounted to said bicycle frame, wherein said dissipater is mounted to said battery case.

16. The regenerative braking energy dissipater system of claim 15 comprising a switch controller, said switch controller comprising an electrical power input portion, said switch controller coupled to said one or more batteries and to said resistor assembly, said switch controller adapted to switch input power between said one or more batteries and said dissipater based upon the charge state of said one or more batteries.

17. The regenerative braking energy dissipater system of claim 16 wherein said dissipater plate has fins on said second side.

18. The regenerative braking energy dissipater system of claim 17 wherein said resistor assembly comprises are surface mount resistors.

19. The regenerative braking energy dissipater system of claim 17 wherein said dissipater plate is mounted with thermally insulated mounting pads.

20. The regenerative braking energy dissipater system of claim 15 wherein said dissipater plate is mounted with thermally insulated mounting pads.

21. The regenerative braking energy dissipater system of claim 14 wherein said dissipater plate has fins on said second side.

22. The regenerative braking energy dissipater system of claim 14 wherein said resistor assembly comprises surface mount resistors.

23. The regenerative braking energy dissipater system of claim 22 wherein said resistors are mounted to a printed circuit board coupled to said dissipater plate.

24. The regenerative braking energy dissipater system of claim 14 wherein said dissipater plate is mounted with thermally insulated mounting pads.

25. A method of dissipating heat generated during braking of a bicycle, said method comprising the steps of:
braking with a regenerative braking system, thereby generating electrical power;
routing the electrical power generated by the regenerative braking system to an energy dissipation system; and
dissipating said energy in said energy dissipation system, wherein the regenerative braking system comprises a battery, and wherein the step or routing electrical power generated by the regenerative braking system to an energy dissipation system comprises routing electrical power to a switch controller which directs said electrical power to said energy dissipation system when said battery is at or above a predetermined state of charge, and wherein the step of dissipating said energy comprises routing said energy to one or more load resistors.

26. The method of claim 25 wherein said load resistors are mounted to a dissipater plate.

27. The method of claim 26 wherein the step of dissipating said energy comprises the step of causing air to flow along said dissipater plate.

28. The method of claim 27 wherein said dissipater plate is mounted to a battery case.

29. The method of claim 28 wherein said air flow above said dissipater plate and through an airflow passage between the bottom of said dissipater plate and surface of said battery case.

30. The method of claim 27 wherein said air flows above and below said dissipater plate.

* * * * *